United States Patent
Adimatyam et al.

(10) Patent No.: US 8,862,763 B2
(45) Date of Patent: Oct. 14, 2014

(54) DOWNLOADING VIDEO USING EXCESS BANDWIDTH

(75) Inventors: Venkata S. Adimatyam, Irving, TX (US); Sameer Vasant Gavade, Irving, TX (US); Daksh Jasra, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 622 days.

(21) Appl. No.: 13/075,269

(22) Filed: Mar. 30, 2011

(65) Prior Publication Data

US 2012/0254455 A1 Oct. 4, 2012

(51) Int. Cl.
*G06F 15/16* (2006.01)
*H04N 21/442* (2011.01)
*H04N 21/6373* (2011.01)
*H04N 21/472* (2011.01)
*H04N 21/845* (2011.01)

(52) U.S. Cl.
CPC ..... *H04N 21/6373* (2013.01); *H04N 21/44209* (2013.01); *H04N 21/47217* (2013.01); *H04N 21/8456* (2013.01)
USPC ........... 709/231; 709/232; 709/233; 709/234; 709/235

(58) Field of Classification Search
None
See application file for complete search history.

(56) References Cited

U.S. PATENT DOCUMENTS

| | | | |
|---|---|---|---|
| 7,337,231 B1 * | 2/2008 | Li | 709/231 |
| 2002/0099844 A1 * | 7/2002 | Baumann et al. | 709/232 |
| 2005/0033856 A1 * | 2/2005 | Li | 709/231 |
| 2009/0300203 A1 * | 12/2009 | Virdi et al. | 709/231 |
| 2012/0084455 A1 * | 4/2012 | McCue et al. | 709/231 |
| 2012/0269259 A1 * | 10/2012 | Sauer et al. | 375/240.02 |

* cited by examiner

*Primary Examiner* — Djenane Bayard

(57) ABSTRACT

A method may include downloading a first segment of a video in a first bit-rate quality at the first bit rate and storing the downloaded first segment of the video in the first bit-rate quality. The method may further include downloading a second segment of the video in a second bit-rate quality at the second bit rate, wherein the second bit rate is greater than the first bit rate and storing the downloaded second segment of the video in the second bit-rate quality. The method may also include downloading the first segment of the video at the second bit-rate quality using excess bandwidth while downloading the second segment of the video in the second bit-rate quality at the second bit rate and storing the downloaded first segment of the video in the second bit rate-rate quality.

21 Claims, 15 Drawing Sheets

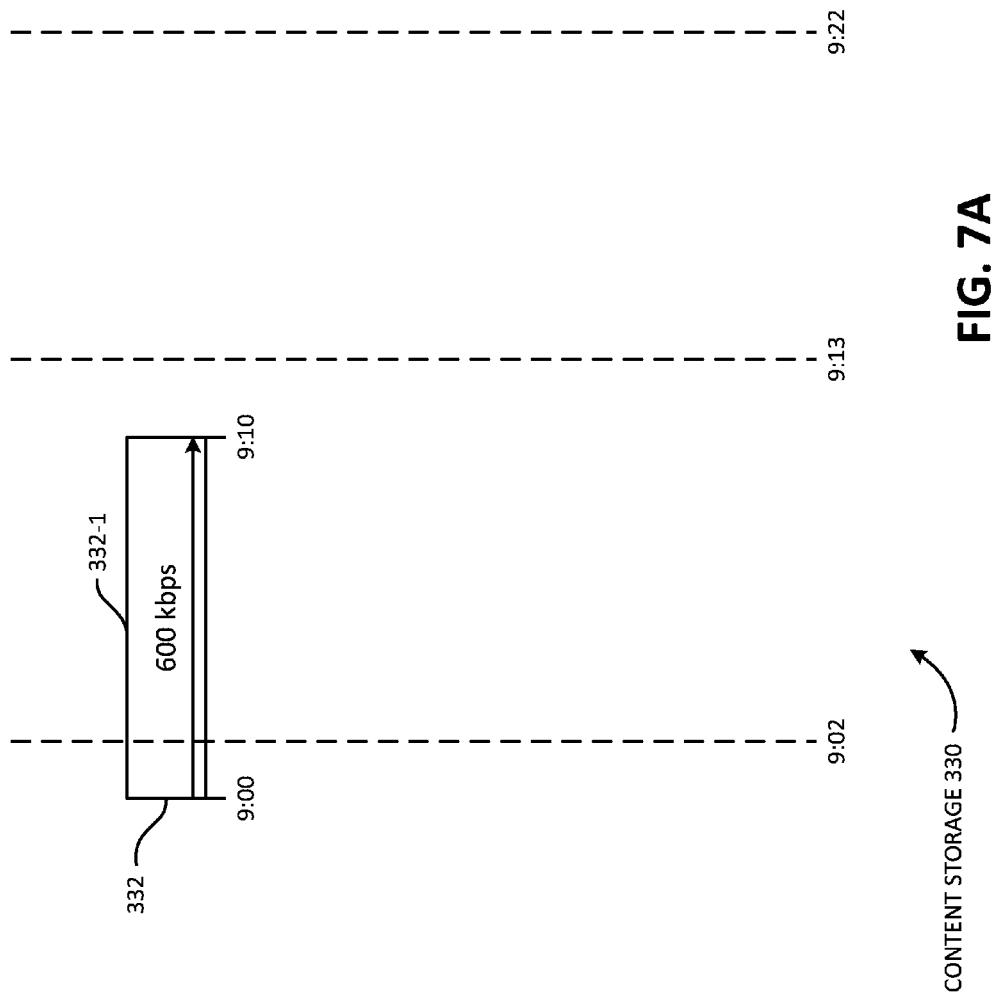

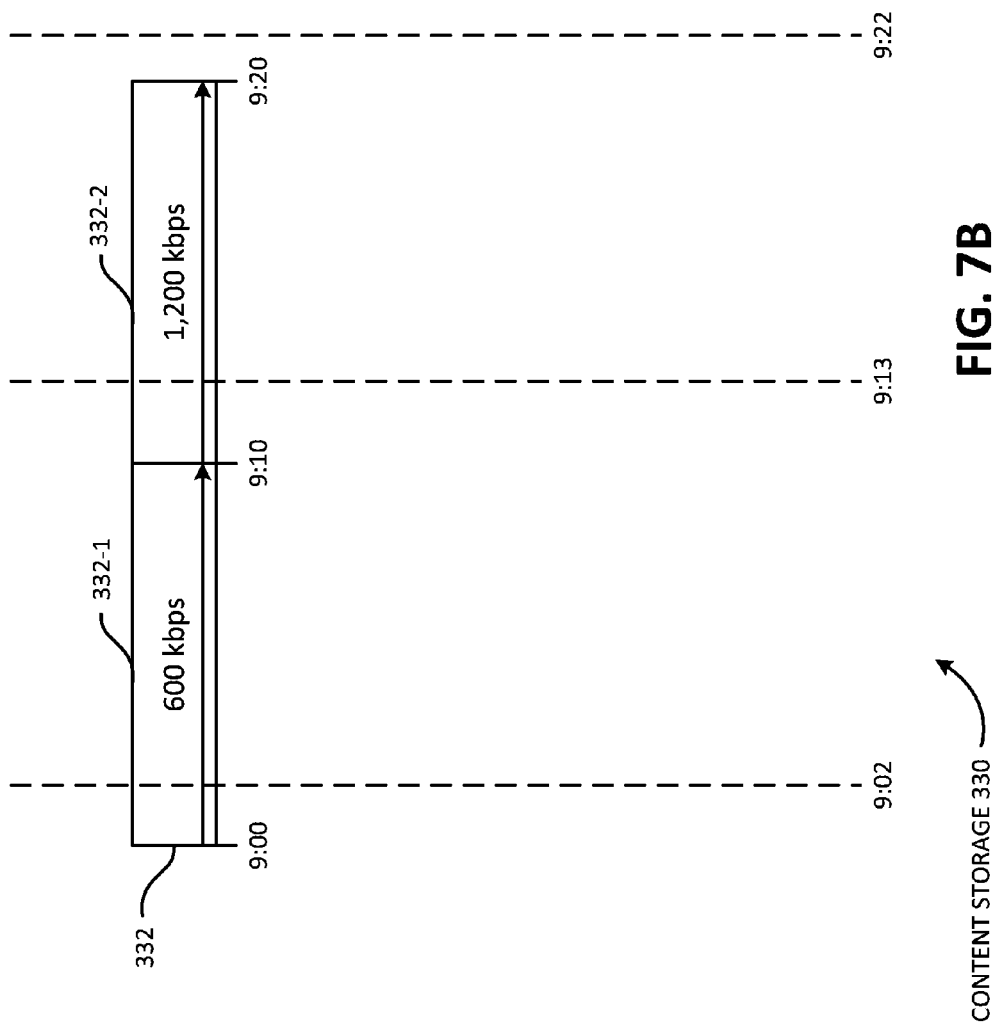

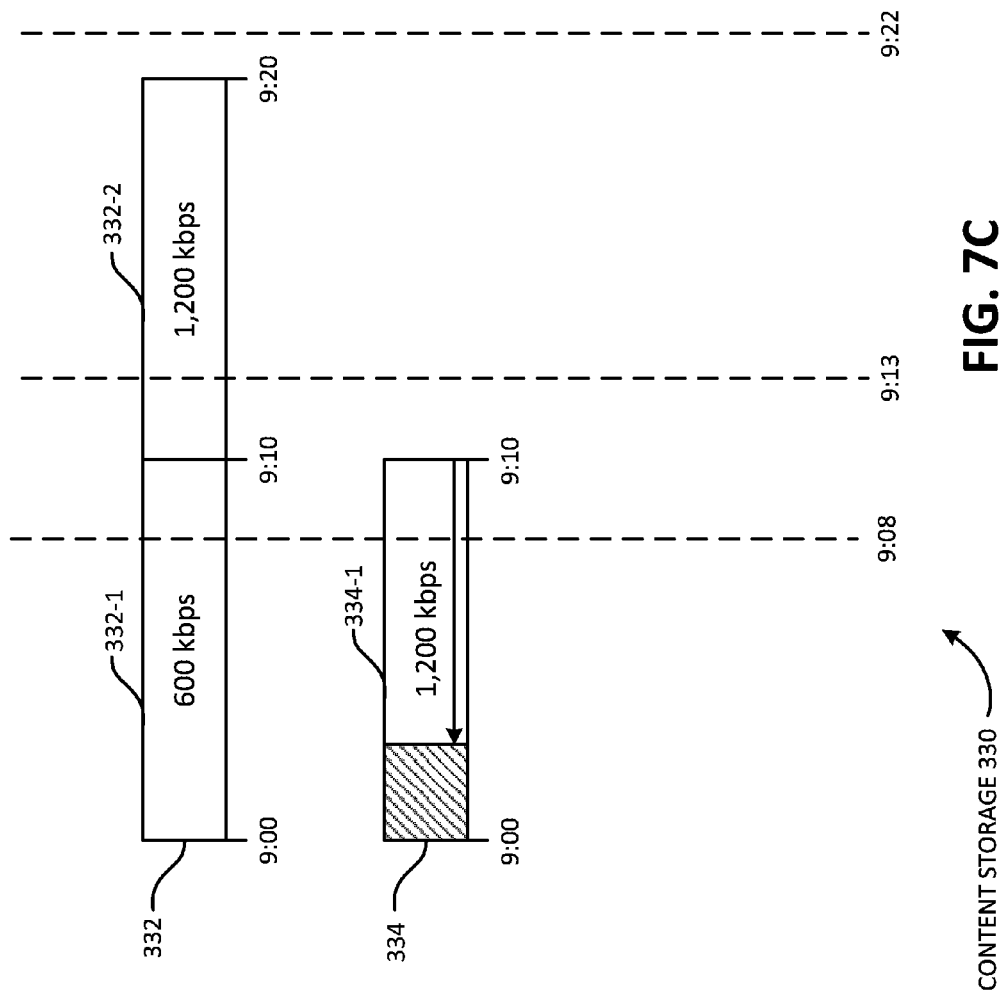

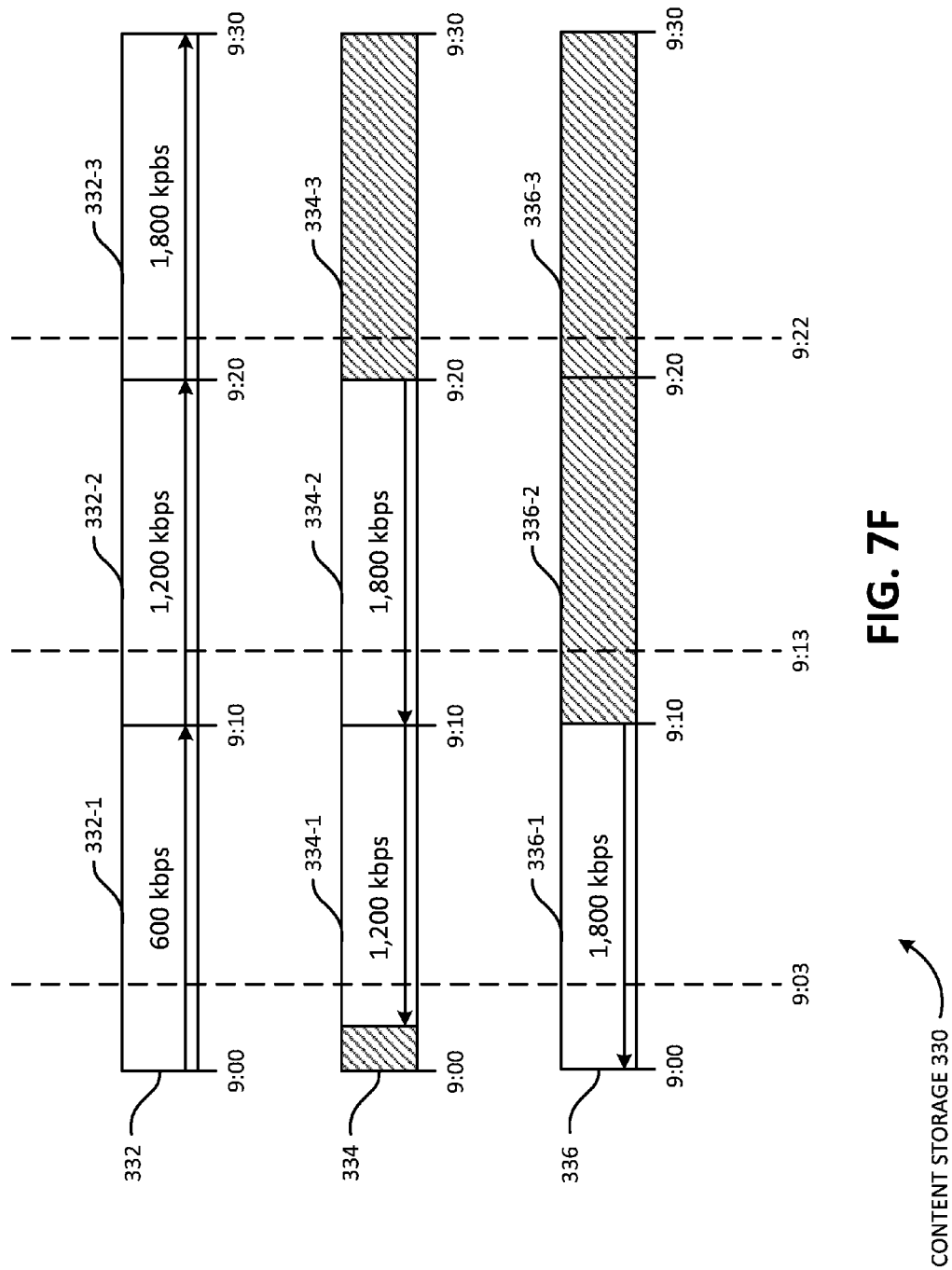

DOWNLOADING VIDEO USING EXCESS BANDWIDTH

BACKGROUND INFORMATION

Television programs and movies, as well as other types of video, are increasingly being delivered to consumers over packet-switched networks (e.g., such as the Internet). The quality of video delivered to consumers may vary and may depend on the bandwidth available to the consumer. For example, a consumer that subscribes to 5000 kilo bits per second (kbps) of data for Internet service may be able to download higher-quality of video than a consumer that subscribes to 2000 kbps. In some instances, a consumer's bandwidth may vary depending on the quantity of other data traffic in the household or even based on other traffic in his neighborhood.

BRIEF DESCRIPTION OF THE DRAWINGS

FIGS. 7A through 7F are block diagrams of exemplary files storing video at differing qualities.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

As discussed above, more and more video is being distributed or streamed over packet-switched networks. User devices (such as a computer, set-top box, or mobile device) may request video for streaming depending on the bandwidth available to the device. For example, faced with limited bandwidth, a user device may request low-quality video (e.g., requiring a low data or bit rate) from a remote video server. When the available bandwidth increases, the same user device may request the same video (e.g., a later segment of the same video) in a higher-quality format (e.g., at a higher data rate). Video servers may store the same content at different qualities to satisfy different devices connected to the network with different available bandwidths. For example, a video server may store video in a high quality format (e.g., requiring a high data rate), in a medium quality (e.g., requiring a medium data rate), or a low quality (e.g., requiring a low data rate).

Hyper-text transfer protocol (HTTP) Live Streaming (HLS) is one protocol for user devices to request different segments of video from a server at different data rates. HLS may break the overall stream into a sequence of small HTTP-based file downloads, each download loading one short segment of a potentially unbounded transport stream. As the stream is played, the user device may dynamically select from a number of different alternate streams containing the same content encoded at a variety of data rates, allowing the streaming session to adapt to the available bandwidth.

Embodiments disclosed herein allow for a user to view high-quality segments of video, even though the bandwidth available during the initial download of the video segment was not sufficient enough to support the higher-quality video. For example, a user device may download an initial segment of a video at an initially low data rate at a quality commensurate to that data rate (e.g., a low quality). At some later time, the user device may download a second segment of the video at a higher data rate at a quality commensurate to the higher bit rate (e.g., a high quality). In one embodiment, the user device may download the initial segment of the video at the quality associated with the higher data-rate using excess bandwidth. The excess bandwidth may occur, for example, while downloading the second segment of the video at the higher data rate. Thus, should a user request to view the initial segment of the video (e.g., by rewinding), the user device may show the initial segment at the higher quality commensurate to the higher data rate.

Figure 1:
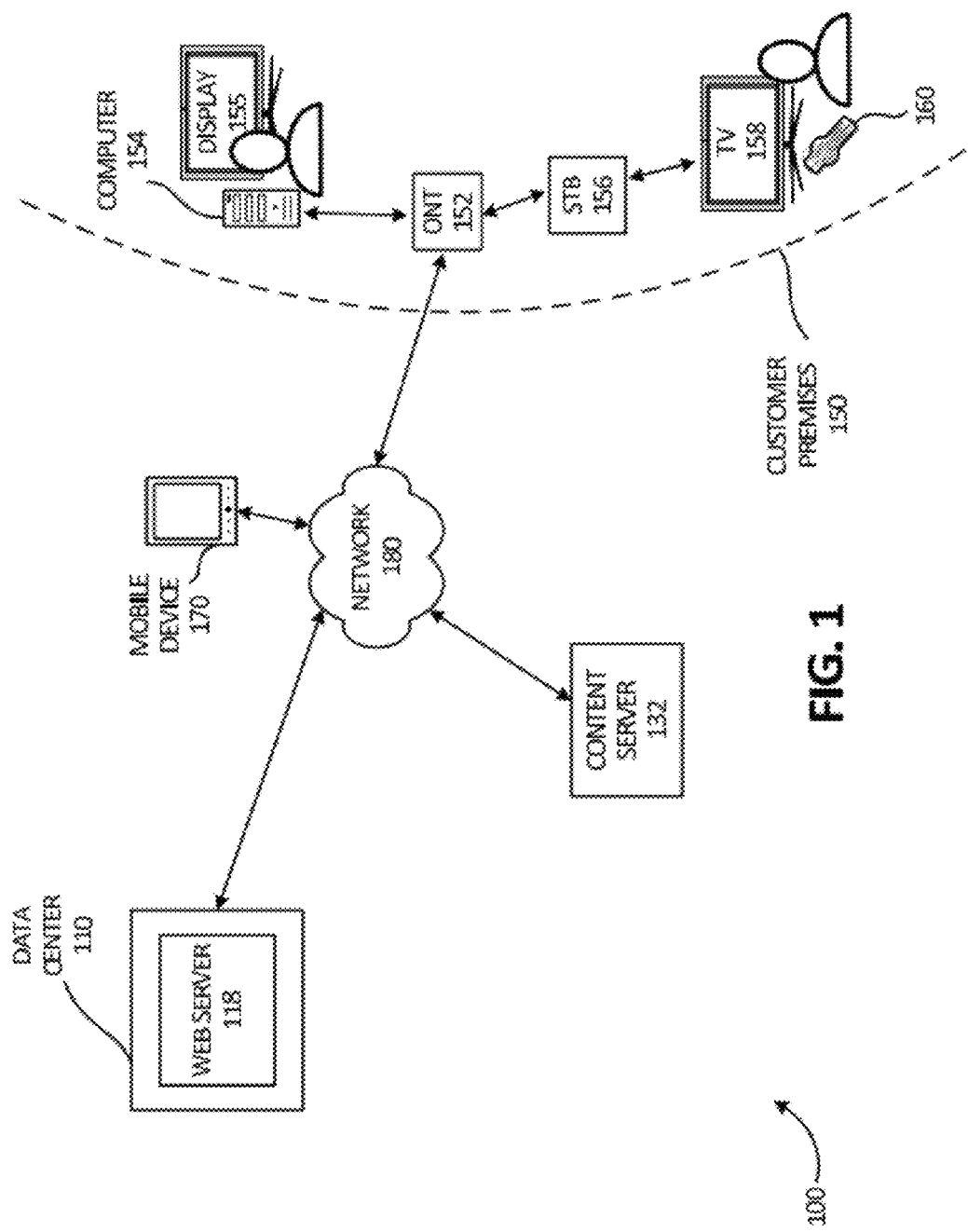
FIG. 1 is a diagram of an exemplary network for implementing the embodiments described herein.

FIG. 1 is a diagram of an exemplary network 100 for implementing embodiments disclosed herein. Network 100 may include a data center 110, a content server 132, customer premises 150, a mobile device 170, and a network 180. The devices in network 100 may form part of a high-speed fiber optic network (e.g., FiOS™).

Customer premises 150 (e.g., a customer's home) may include an optical network terminal (ONT) 152, a personal computer 154, a set-top box (STB) 156, a television 158, and a remote control 160. Devices in customer premises 150 may include one or more computers for hosting programs, such as a program for a user to view content stored, for example, in STB 156, web server 118, and/or content server 132. Devices in customer premises 150 and mobile device 170 may be considered "user devices" or "network devices."

ONT 152 may receive data, e.g., on a fiber optic cable, and may transmit data to the appropriate device in customer premises 150, such as computer 154 or STB 156. Likewise, ONT 152 may receive data from any device in customer premises 150 and may transmit the data to other devices in network 100, e.g., through a fiber optic cable. ONT 152 may provide customer premises 150 with Internet access, television access, or telephone service, for example. In one implementation, customer premises 150 may include a cable modem and/or a Digital Subscriber Line (DSL) modem in addition to or instead of an optical network terminal for receiving and transmitting data.

Computer 154 may include a laptop, a desktop, a tablet computer, a mobile telephone, a personal digital assistant (PDA), or another computation and/or communication device. Computer 154 may also include a display 155 for showing images or video. Computer 154 may also include a speaker for playing audio. Computer 154 may interact with data center 110 or content server 132 to provide a user with the ability to download and view content. In this embodiment, display 155 may play the video stored remotely (e.g., in data center 110 or content server 132) or locally. Computer 154 may connect to network 180 (e.g., the Internet) through ONT 152, for example.

STB 156 may receive content and output the content to TV 158 for display. STB 156 may include a component (e.g., a cable card or a software application) that interfaces with (e.g., plugs into) a host device (e.g., a personal computer, TV 158, a stereo system, etc.) and allows the host device to display content. STB 156 may also be implemented as a home theater personal computer (HTPC), an optical disk player (e.g., digital video disk (DVD) or Blu-Ray™ disc player), a cable card, etc. STB 156 may receive commands or data from other devices in network 100, such as remote control 160, and may transmit data to other devices in network 100 (e.g., to data center 110).

TV 158 may output content received from STB 156, for example. TV 158 may include speakers as well as a display. In one embodiment, TV 158 may display the video stored in STB 156 or remotely (e.g., in data center 110) after download. Remote control 160 may issue wired or wireless commands for controlling other electronic devices, such as TV 158 or STB 156. Remote control 160, in conjunction with STB 156, may allow a user to interact with an application running on STB 156, such as an application to record and/or play content. Other types of devices (e.g., a keyboard, mouse, mobile phone, etc.) may be used instead of remote control 160.

Mobile device 170 may include a mobile phone, a tablet computer, a laptop, a PDA, or another portable communication device. In one embodiment, mobile device 170 may download and run applications, including applications from Apple's™ App Store, Amazon's™ Application store for Android or Kindle devices, Google's Marketplace for Android devices, Verizon's Application store for Android devices, etc. In one embodiment, mobile device 170 may include a modern, standards-compliant browser that can execute JavaScript, HTML5, etc. In this embodiment, an application running in mobile device 170 may allow for a user to record and play content as described herein.

Data center 110 may include one or more servers (e.g., "network devices") that manage and/or store programs and data associated with allowing users to view content. As shown in FIG. 1, data center 110 may include a web server 118. Web server 118 and other devices in data center 110 may include one or more computers for hosting programs, such as a web server (e.g., Apache), a database (e.g., MySQL), or other applications. In one embodiment, web server 118 may include a database that stores content. For example, a user in customer premises 150 may wish to watch or record a program being stored in web server 118. When the user requests to view the content, the content may be streamed from web server 118 to customer premises 150. The program may be downloaded and stored locally in customer premises 150 (e.g., STB 156) as described below, for example.

Content server 132 may store and provide on-demand or other content (e.g., broadcast content). Content server 132 may also include a catalog of programs for a user to browse and select. For example, a user in customer premises 150 may select a program through content server 132 for viewing.

Network 180 may include one or more packet switched networks, such as an Internet protocol (IP) based network, a local area network (LAN), a wide area network (WAN), a personal area network (PAN), an intranet, the Internet, a cellular network, a fiber-optic network, or another type of network that is capable of transmitting data. Network 180 may include a circuit-switched network, such as a public-switched telephone network (PSTN) for providing telephone services for traditional telephones. Network 180 may allow devices at customer premises 150 (e.g., computer 154 or STB 156) to connect to other devices also coupled to network 180.

The exemplary configuration of devices in network 100 is illustrated for simplicity. Network 100 may include more devices, fewer devices, or a different configuration of devices than illustrated in FIG. 1. For example, network 100 may include thousands or millions of customer premises. In some embodiments, the functions performed by two or more devices may be performed by any one device. Likewise, in some embodiments, the functions performed by any one device may be performed by multiple devices. Further, the connections shown in FIG. 1 are exemplary. In other embodiments, additional connections that are not shown in FIG. 1 may exist between devices (e.g., each device may be connected to every other device). The connections in FIG. 1 may also be wireless or wired.

Figure 2:
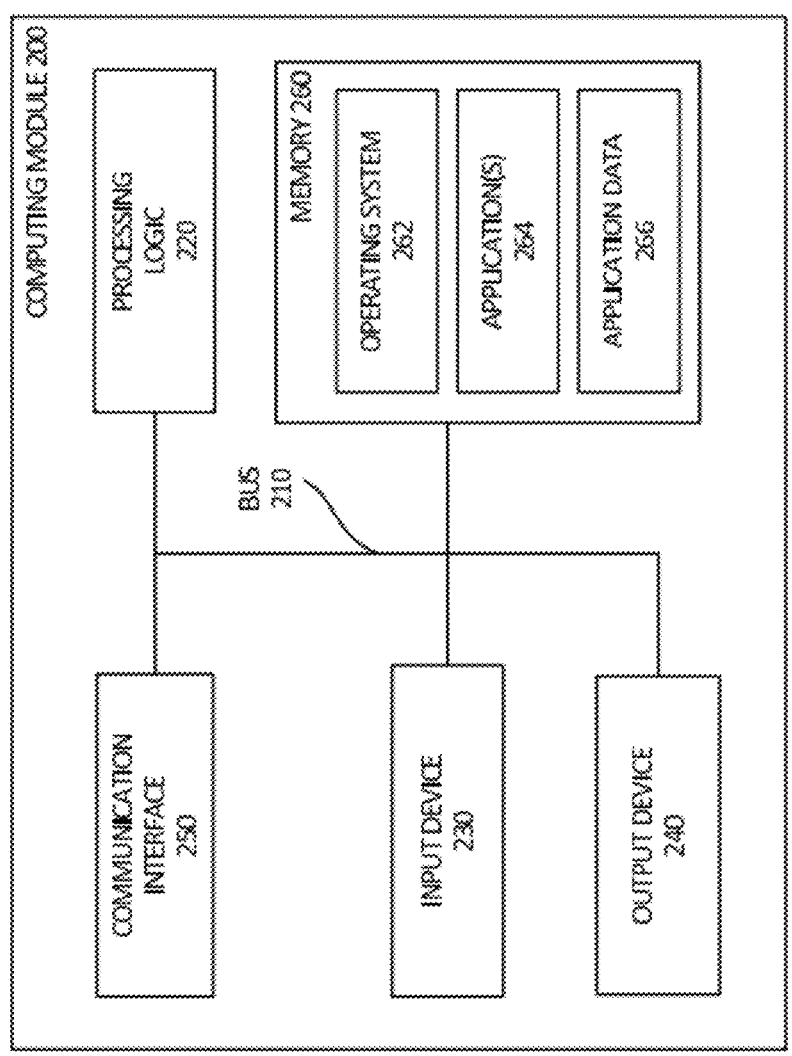
FIG. 2 is a block diagram of exemplary components of a computing module found in the devices of FIG. 1.

Devices in network 100 may each include one or more computing modules. FIG. 2 is a block diagram of exemplary components of a computing module 200. Computing module 200 may include a bus 210, processing logic 220, an input device 230, an output device 240, a communication interface 250, and a memory 260. Computing module 200 may include other components (not shown) that aid in receiving, transmitting, and/or processing data. Moreover, other configurations of components in computing module 200 are possible.

Bus 210 may include a path that permits communication among the components of computing module 200. Processing logic 220 may include any type of processor or microprocessor (or families of processors or microprocessors) that interprets and executes instructions. In other embodiments, processing logic 220 may include an application-specific integrated circuit (ASIC), a field-programmable gate array (FPGA), etc.

Input device 230 may allow a user to input information into computing module 200. Input device 230 may include a keyboard, a mouse, a pen, a microphone, a remote control (e.g., remote control 160), an audio capture device, an image and/or video capture device, a touch-screen display, etc. Some devices in network 100, such as servers in data center 110, may be managed remotely and may not include input device 230. In other words, some devices may be "headless" and may not include a keyboard, for example.

Output device 240 may output information to the user. Output device 240 may include a display, a printer, a speaker, etc. For example, TV 158 and/or personal computer 154 may include display 332 (an output device), which may include a liquid-crystal display (LCD) for displaying content to the user. As another example, ONT 152 and STB 156 may include light-emitting diodes (LEDs). Headless devices, such as servers in data center 110 may be managed remotely and may not include output device 240.

Input device 230 and output device 240 may allow a user to activate and interact with a particular service or application, such as a web browser or an application to search for and discover content. Input device 230 and output device 240 may allow a user to receive and view a menu of options and select from the menu options. The menu may allow the user to select various functions or services associated with applications executed by computing module 200.

Communication interface 250 may include a transceiver that enables computing module 200 to communicate with other devices or systems. Communication interface 250 may include a transmitter that converts baseband signals to radio frequency (RF) signals or a receiver that converts RF signals to baseband signals. Communication interface 250 may be coupled to an antenna for transmitting and receiving RF signals. Communication interface 250 may include a network interface card, e.g., Ethernet card, for wired communications or a wireless network interface (e.g., a WiFi) card for wireless communications. Communication interface 250 may also include, for example, a universal serial bus (USB) port for communications over a cable, a Bluetooth™ wireless interface, a radio-frequency identification (RFID) interface, a near-field communications (NFC) wireless interface, etc.

Memory 260 may store, among other things, information and instructions (e.g., applications 264 and operating system 262) and data (e.g., application data 266) for use by processing logic 220. Memory 260 may include a random access memory (RAM) or another type of dynamic storage device, a read-only memory (ROM) device or another type of static storage device, and/or some other type of magnetic or optical recording medium and its corresponding drive (e.g., a hard disk drive).

Operating system 262 may include software instructions for managing hardware and software resources of computing module 200. For example, operating system 262 may include Linux, Solaris, Windows, OS X, iOS, Android (e.g., Honeycomb), an embedded operating system, etc. Applications 264 and application data 266 may provide network services or include applications, depending on the device in which the particular computing module 200 is found.

Computing module 200 may perform the operations described herein in response to processing logic 220 executing software instructions stored in a computer-readable medium, such as memory 260. A computer-readable medium may include a physical and/or logical memory device. The software instructions may be read into memory 260 from another computer-readable medium or from another device via communication interface 250. The software instructions stored in memory 260 may cause processing logic 220 to perform processes that are described herein.

Figure 3A:
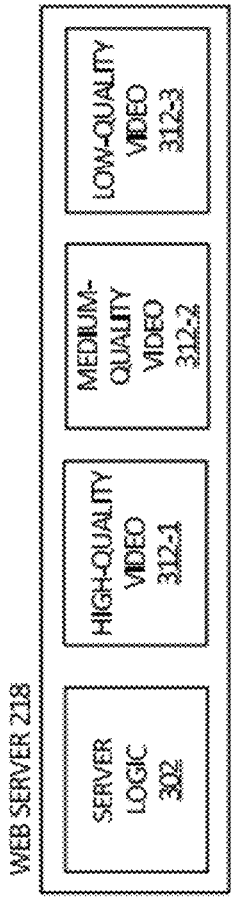
FIG. 3A is a block diagram of exemplary components of the web server of FIG. 1.

As described above with respect to FIG. 1, web server 118 and/or content server 132 may serve video content and/or web pages to user devices, such as a user device in customer premises 150. FIG. 3A is a block diagram of exemplary components of web server 118 (e.g., functions performed by application 264 in processing logic 220 or stored in memory 260 of web server 118). As shown in FIG. 3A, web server 118 may include server logic 302 (e.g., Linux, Apache, MySQL, and PHP (LAMP), etc.) for serving web pages and stored video content. In one embodiment, web server 118 may store high-quality video 312-1 (e.g., video for streaming at 1800 kbps), medium-quality video 312-2 (e.g., video for streaming at 1200 kbps), or low-quality video 312-3 (e.g., video for streaming at 600 kbps). Each of videos 312 may include the same content, but at different bit rates, resolutions, and/or quality. For example, high-quality video 312-1 may include the movie "Psycho" for streaming at 1800 kbps, medium-quality video 312-2 may also include the movie "Psycho" for streaming at 1200 kbps, and low-quality video 312-3 may include the movie "Psycho" for streaming at 600 kbps. In this example, the high-quality video 312-1 may support a greater screen resolution than the medium quality video 312-2 and low-quality video 312-3. Likewise, medium quality video 312-2 may support a greater screen resolution than low quality video 312-3. In other implementations, the quality of video 312 may measured using other metrics than kbps. Further, in other implementations, more than three levels of quality may be offered by web server 118.

Web server 118 may include more, fewer, or a different arrangement of components than shown in FIG. 3A. For example, web server 118 may store an entire library of programs or movies each at various bit-rates or quality.

Figure 3B:
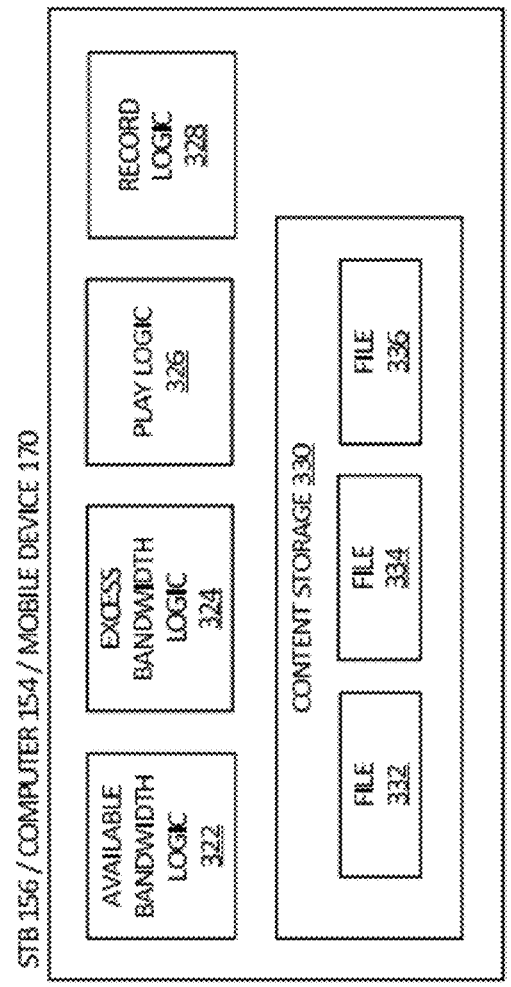
FIG. 3B is a block diagram of exemplary components of the set-top box, computer, or mobile device of FIG. 1.

As described above with respect to FIG. 1, STB 156, computer 154, and/or mobile device 170 may allow a user device to stream, record, and/or play content. FIG. 3B is a block diagram of exemplary components of STB 156, computer 154, and/or mobile device 170 (e.g., functions performed by application 264 in processing logic 220 or stored in memory 260 of STB 156, computer 154, and/or mobile device 170). STB 156, computer 154, and/or mobile device 170 may include available bandwidth logic 322, excess bandwidth logic 324, play logic 326, record logic 328, and content storage 330. STB 156, computer 154, and mobile device 170 may include more, fewer, or a different arrangement of components than shown in FIG. 3B.

Available bandwidth logic 322 may determine the available bandwidth (e.g., the instantaneous download speed in kbps) of a network connection for a device. The available bandwidth may be limited by the network connection (e.g., the connection between ONT 152 and network 180) or by the device (e.g., the processing power or resolution of mobile device 170). For example, a service provider may provide 2,000 kbps service to customer premises 150 through ONT 152 or through a content network. If both STB 156 and computer 154 are streaming movies (e.g., simultaneously) for display on TV 158 and display 155, however, then the instantaneous available bandwidth for each device (computer 154 and TV 158) may be 1,000 kbps (e.g., half the total available). As another example, mobile device 170 may have limited processing power to decode high-quality video stored at 1800 kbps. In this case, available bandwidth logic 322 may determine that the available bandwidth for downloading video is 1200 kbps. Or, mobile device 170 may include a display that best matches low-quality video 312-3 stored for streaming at 600 kbps.

In one example, available bandwidth logic 322 in STB 156 may test its network connection (e.g., bandwidth limited by the connection between STB 156, ONT 152 and/or network 180) and determine that it can download a video at a rate of 800 kbps or less. In this case, STB 156 may request low-quality video 312-3 (e.g., 600 kbps) stored in web server 118, rather than requesting high-quality video 312-2 (e.g., 1800 kbps). If available bandwidth logic 322 determines that it can download a video at a rate of 1400 kbps or less, then STB 156 may request medium-quality video 312-2 (e.g., 1200 kbps) stored in web server 118, rather than requesting high-quality video 312-2 (e.g., 1800 kbps). As another example, if available bandwidth logic 322 determines that it can download a video at a rate of 2000 kbps or less, then STB 156 may request high-quality video 312-1 (e.g., 1800 kbps) stored in web server 118. Requesting a video at a bit rate greater than the available bandwidth may lead to a poor viewing experience by the user.

Available bandwidth logic 322 may determine the available bandwidth by transmitting and receiving packets at various bit rates. The available bandwidth may be determined by detecting the greatest bit rate at which packets are not lost. In another embodiment, available bandwidth logic 322 may download a file and measure the time it takes to complete the full download. The available bandwidth may be calculated by dividing the file size by the time it took to download the file. The available bandwidth may be measured by the number of bits transmitted per second, for example. The available bandwidth may also be limited by other factors, such as the resolution of the screen of the user device that displays content or the processing power of the user device. Available bandwidth logic 322 may determine the available bandwidth on a continuous basis or a periodic basis (e.g., every few seconds, minutes, etc).

Record logic 328 may request, download, and/or stream video at a rate that corresponds to the determinations of available bandwidth logic 322. For example, if available bandwidth logic 322 determines that the available bandwidth is 1400 kbps, then STB 156 may request medium-quality video 312-2 (e.g., 1200 kbps) stored in web server 118, rather than requesting high-quality video 312-2 (e.g., 1800 kbps). As discussed in more detail below, record logic 328 may also download video using excess bandwidth identified by excess bandwidth logic 324.

Excess bandwidth logic 324 may determine the bandwidth available to a device during streaming or downloading of a video. For example, assume that available bandwidth logic 322 determines that the available bandwidth is 800 kbps. Record logic 328 may request and download a video at 600 kbps. In this example, the excess bandwidth may be 200 kbps (e.g., the difference between 800 and 600 kbps). As another example, if available bandwidth logic 322 determines that the available bandwidth is 1400 kbps and record logic 328 requests a video and downloads the video at 1200 kbps, then the excess bandwidth may also be 200 kbps. If available bandwidth logic 322 determines that the available bandwidth is 1800 kbps, and record logic 328 requests and downloads video at 1600 kbps, and 100 kbps is being used for other purposes, then excess bandwidth logic 324 may determine the excess bandwidth is 100 kbps.

In one embodiment, record logic 328 may use the excess bandwidth to download video at a rate slower than the intended rate for streaming the video. For example, assume that excess bandwidth logic 324 determines that there is 200 kbps of excess bandwidth. Record logic 328 may download high-quality video at 312-1 at 200 kbps, even though the high-quality video is intended for streaming at 1800 kbps. In this embodiment, record logic 328 may store the high-quality video (e.g., downloaded at 200 kbps) for later viewing. That is, in this embodiment, record logic 328 and play logic 326 may choose not to stream high-quality video 312-1 being downloaded at 200 kbps because doing so may not provide for a good user experience (e.g., freezing of video).

Figure 4:
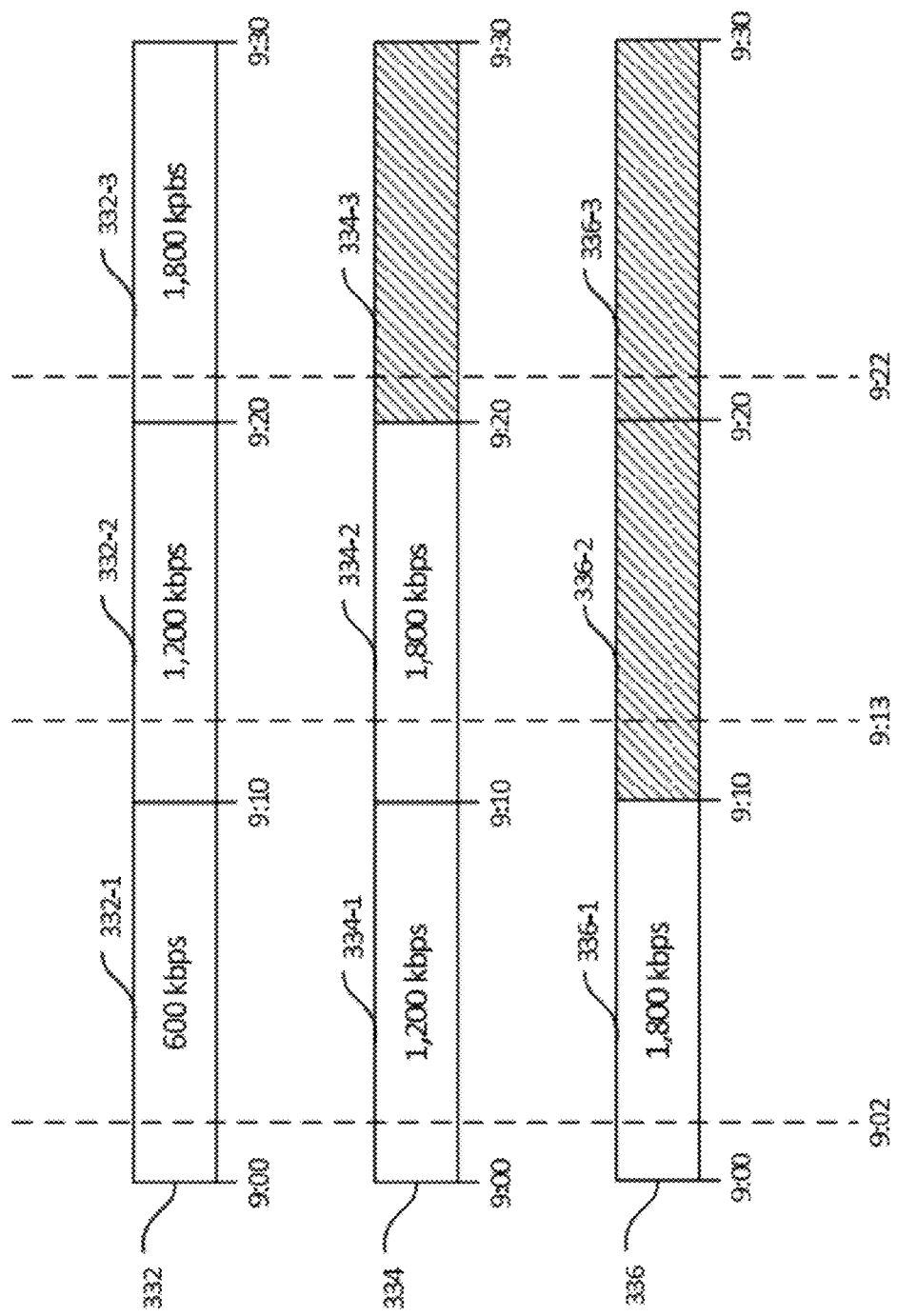
FIG. 4 is a block diagram of three data files, each storing video at different qualities.

Content storage 330 may include a first file 332, a second file 334, and a third file 336. As shown in FIG. 4, first file 332 stores a first segment 332-1 at a quality corresponding to 600 kbps (e.g., a lower quality corresponding to a time period from 9:00 to 9:10), a second segment 332-2 at a quality corresponding to 1200 kbps (e.g., a medium quality corresponding to a time period from 9:10 to 9:20), and a third segment at a quality corresponding to 1800 kbps (e.g., a higher quality corresponding to a time period from 9:20 to 9:30). Second file 334 stores a first segment 334-1 at a quality corresponding to 1200 kbps (e.g., a medium quality corresponding to a time period from 9:00 to 9:10) and a second segment 334-2 at a quality corresponding to 1800 kbps (e.g., a higher quality corresponding to a time period from 9:10 to 9:20). A third segment 334-3 of second file 334 remains empty (as indicated with hash lines). Third file 336 stores a first segment 336-1 of video at a quality corresponding to 1800 kbps (e.g., a higher quality corresponding to a time period from 9:00 to 9:10). A second segment 336-2 and a third segment 336-3 of third file 336 remain empty (as indicated with hash lines).

Play logic 326 may advance and/or rewind video being played. Play logic 326 may also play content at any point in time instructed by the user. In other words, play logic 326 may receive commands from a remote control (e.g., as input by a user) for playing, rewinding, or forwarding through content. Play logic 326 may compare files (e.g., file 332, file 334, and file 336) to determine which file should be played. In one embodiment, play logic 326 plays the file or segment associated with the highest quality. Play logic 326 may also switch between files or segments if desired. For example, if the user instructs play logic 326 to play the video stored in files 332, 334, and 336, at time 9:02, then play logic 326 may select segment 336-1 to play because it is the highest quality (e.g., as compared to segment 334-1 and segment 332-1). After continued playback, play logic 326 may switch to file 334 (e.g., segment 334-1) at 9:10 for continued playback (e.g., rather than segment 332-2 in file 332). After yet more continued playback, play logic 326 may switch to file 332 (e.g., segment 332-3) at 9:20 for continued playback.

Figure 5A:
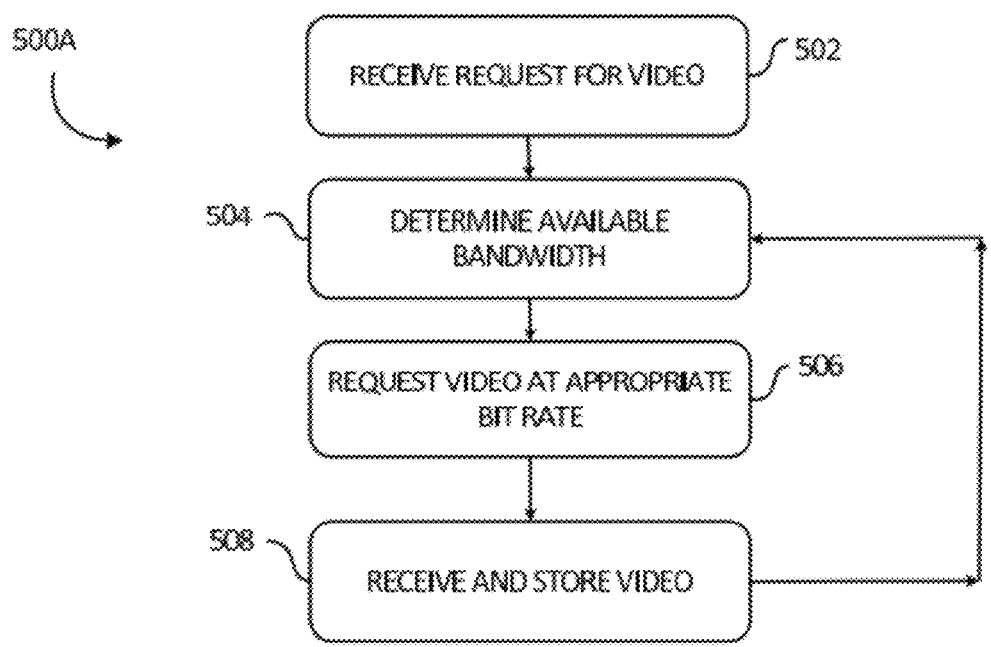
FIG. 5A is a flowchart of a process for recording and/or streaming content for viewing.

As described above, network 100 may allow a user (e.g., a customer in customer premises 150) to stream, record, and/or view content from web server 118 and/or content server 132. FIG. 5A is a flowchart of a process 500A for recording and/or streaming content for viewing. Process 500A may begin with the receipt of a request for video from a user (block 502). In the following example, at 9:00 STB 156 receives a request to view video 312 that is stored in web server 118. In this example, video file 312 requested by the user is not stored locally in STB 156. In other words, files 332, 334, and 336 do not yet exist in content storage 330. Thus, record logic 328 may request video 312 stored in web server 118 for playing on TV 158. STB 156 has a choice of video files to request. For example, record logic 328 may select high-quality video 312-1 (e.g., for streaming at 1800 kbps), medium quality video 312-2 (e.g., for streaming at 1200 kbps), or low-quality video 312-3 (e.g., for streaming at 600 kbps). STB 156 may download video file 312 to generate files 332, 334, and 336, as described below.

Figure 6:
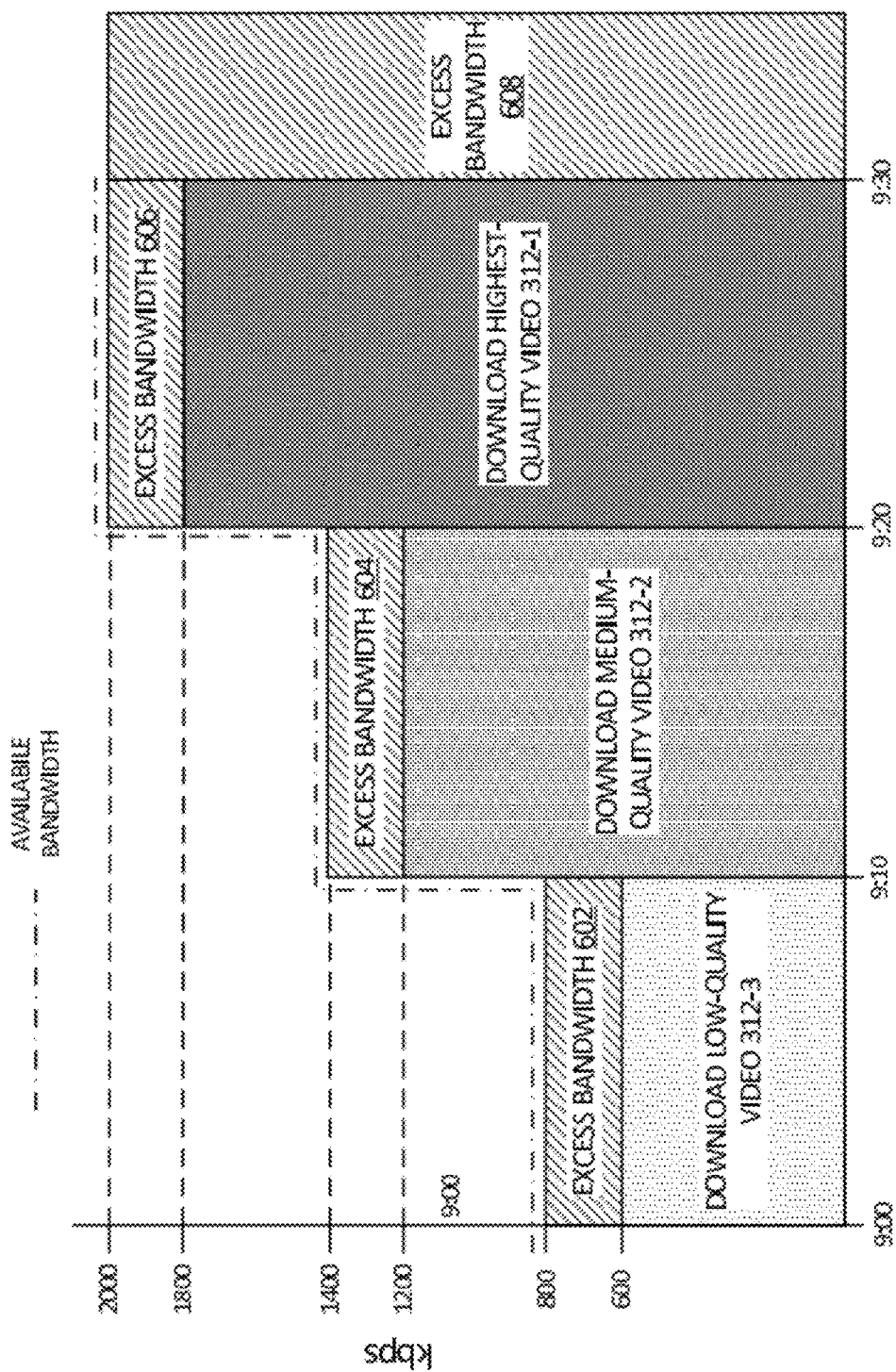
FIG. 6 is a plot of available bandwidth and excess bandwidth versus time in an exemplary embodiment.

The available bandwidth may be determined (block 504). As described above, available bandwidth logic 322 may determine the available bandwidth for streaming video 312 from web server 118 to STB 156. In this example, assume that at 9:00 (the time of the request from the user), the bandwidth available for streaming video 312 is 800 kbps. That is, although customer premises 150 may be provided with 2000 kbps of bandwidth, for example, 1200 kbps are already being used for other reasons (e.g., other services such as interactive game play by a person using computer 154). FIG. 6 is a plot of available bandwidth (indicated with a dashed and dotted line) with respect to time (e.g., from 9:00 to 9:30) in customer premises 150 for the current example. As shown, at 9:00 the available bandwidth is 800 kbps.

Figure 7D:
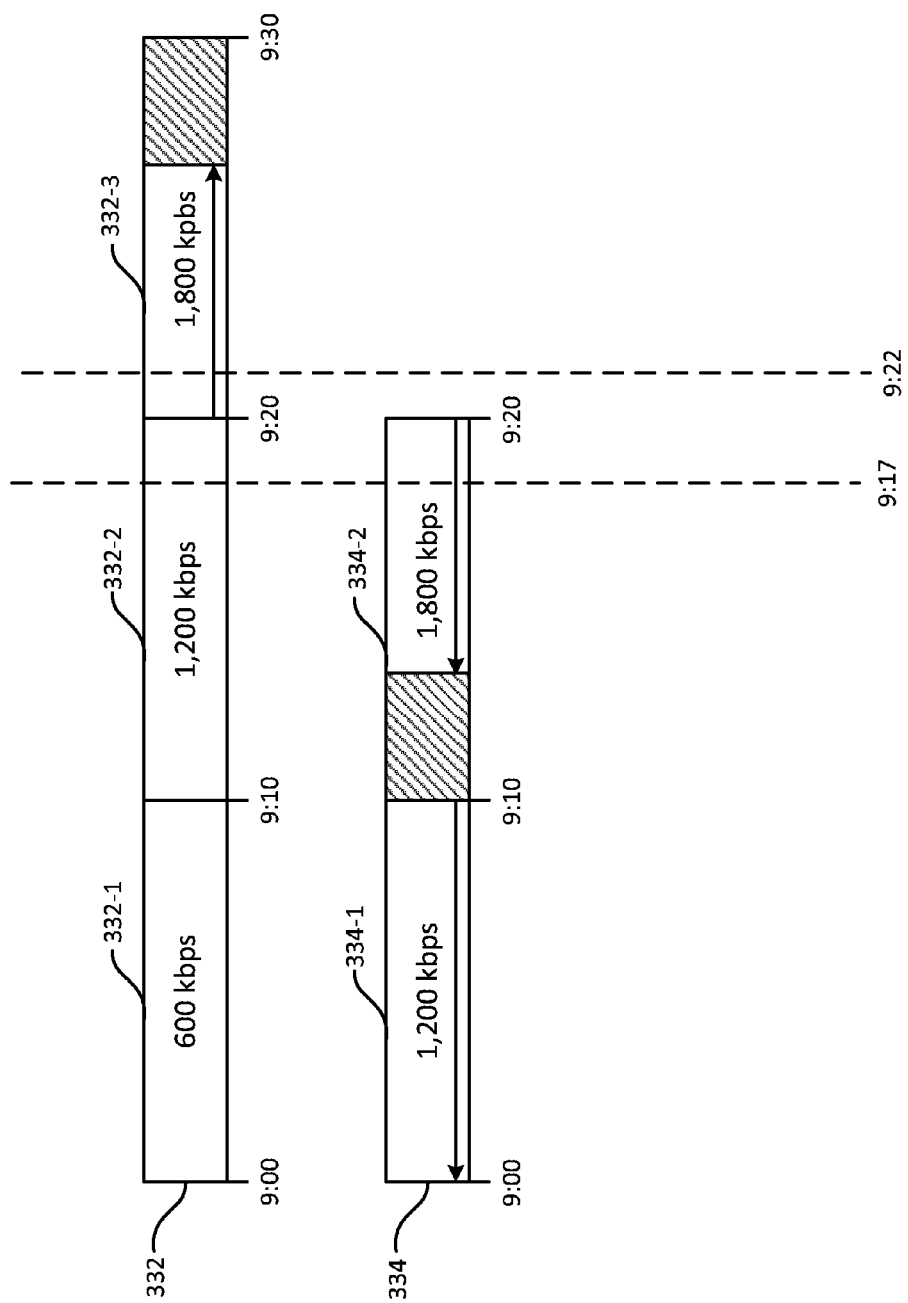

The video may be requested at an appropriate bit rate (block 506). In the current example, record logic 328 requests video file 312-3 because it is the highest rate that is also less than the available bandwidth (e.g., 800 kbps). The video may be received and stored (block 508). In the case where the video is streamed and watched, the video may be played simultaneously (e.g., when there is sufficient video data in a buffer to provide for continuous playing). In the current example, record logic 328 downloads video file 312-3 (e.g., at the rate of 600 kbps) and stores the video in file 332 in segment 332-1. FIGS. 7A through 7F are block diagrams of files 332, 334, and 336 at different time periods. As shown in FIG. 7A, memory 260 of STB 156 stores segment 332-1 in file 332 at a quality corresponding to 600 kbps. As indicated by the arrow, segment 332-1 is stored in the "forward" direction as time progresses from 9:00 to 9:10.

The available bandwidth may change periodically and process 500A may repeat. For example, as shown in FIG. 6, from time 9:00 to time 9:10, available bandwidth logic 322 determines (block 504) that the available bandwidth is 800 kbps. At time 9:10 through time 9:20, however, available bandwidth logic 322 determines (block 504) that the available bandwidth increases from 800 kbps to 1600 kbps. In this case, record logic 328 then requests (block 506) medium-quality video 312-2 from web server 118 (block 506). Record logic 328 then receives and stores (block 508) the video file as segment 332-2 in file 332, as shown in FIG. 7B, in the forward direction.

Figure 5B:
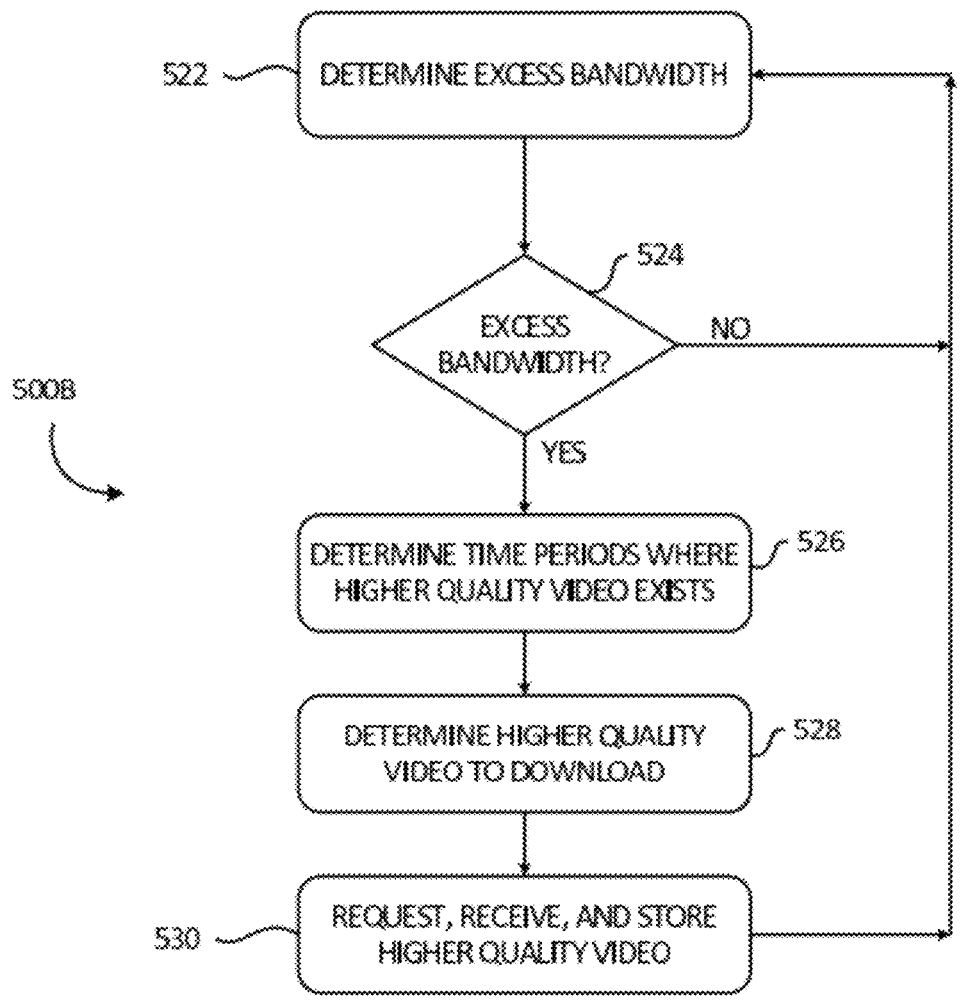
FIG. 5B is a flowchart of a process for downloading video at a higher quality using excess bandwidth.

While process 500A is executing and generating file 332, process 500B may also be executing in STB 156. FIG. 5B is a flowchart of a process for downloading video at a higher quality using excess bandwidth. Process 500B may begin with the excess bandwidth being determined (block 522). As shown in FIG. 6, excess bandwidth logic 324 determines that there is 200 kbps excess bandwidth 602 between 9:00 and 9:10 (e.g., the difference between the available bandwidth of 800 kbps and the bandwidth used for downloading low quality video 312-3 and any other bandwidth use). Excess bandwidth logic 324 also determines that there is 200 kbps excess bandwidth between 9:10 and 9:20 (e.g., the difference between the available bandwidth of 1600 kbps and the bandwidth used for downloading medium-quality video 312-2 and any other bandwidth use).

If there is excess bandwidth (block 524: YES), then the time period(s) where higher quality video exists may be determined (block 526). In the current example, excess bandwidth logic 324 determines that the time period between 9:00 and 9:10 (e.g., segment 332-1) is associated with higher quality video (e.g., medium-quality video 312-2 or high-quality video 312-1) at web server 118. Higher quality video may be requested, received, and stored (block 530). In the current example, record logic 328 may request medium-quality video 312-2 for the time period between 9:00 and 9:10. Medium-quality video 312-2 may be downloaded (e.g., using excess bandwidth 604) at a rate (e.g., 200 kbps) less than the streaming rate (1200 kbps) because, in this example, video being downloaded would not be immediately played, but could be played after storing the video. As shown in FIG. 7C, medium-quality video 312-2 may be stored as segment 334-1 in file 334. Further, in this example, segment 334-1 may be retrieved and stored in reverse chronological order, as indicated by the arrow (e.g., in groups of pictures (GOPs) in reverse order).

Thus, in this embodiment, should the user rewind downloaded video 312 from 9:13 to 9:08 (see FIG. 7C), for example, then the quality of video would be the same at time 9:08 as time 9:13. That is, the quality of video would be that provided by medium-quality video 312-2 at 1200 kbps for both 9:13 and 9:08. Play logic 322 may select to play the video from file 334, segment 334-1, for time 9:08, rather than video from file 332, segment 332-1 because segment 334-1 is a higher quality than segment 332-1. When play reaches 9:10, play logic 322 may select file 332, segment 332-2. In this embodiment, the quality of the video is consistent (e.g., the quality associated with 1200 kbps) at the transition of border 9:10, even though the available bandwidth changed during the downloading of file 332.

In the current example, at time 9:20 as shown in FIG. 6, available bandwidth logic 322 determines that the available bandwidth is 2000 kbps (block 504). Available bandwidth logic 322 may then request (block 506) high-quality video 312-1 rather than medium-quality video 312-2. Thus, as shown in FIG. 7D, file 332 includes video at 1800 kbps from 9:20 onward (e.g., segment 332-3). At this time, excess bandwidth logic 324 determines that there is an excess bandwidth 606 (block 526) of 200 kbps and determines that files 332 and 334 include lower-quality video (e.g., segments 332-2 and 334-1) than is available for the time period before 9:20. As such, record logic 328 may use excess bandwidth 606 to begin to download high-quality video 312-1 for file 334 for the time period between 9:20 and 9:10 (e.g., segment 334-2). In one embodiment, video 312 is downloaded in reverse chronological order (e.g., as GOPs in reverse order), as indicated by an arrow in FIG. 7D. Therefore, should the user rewind from 9:22 to 9:17, the user may experience the same video quality at time 9:17 as time 9:22 (see FIG. 7D) even though the available bandwidth changed while recording file 332 at time 9:20. Play logic 322 may select to play from file 334, segment 334-2, rather than from file 332, segment 332-2 because segment 334-2 includes higher-quality video. At time 9:20, play logic 322 may select to play from file 332, segment 332-3, for example.

Figure 7E:
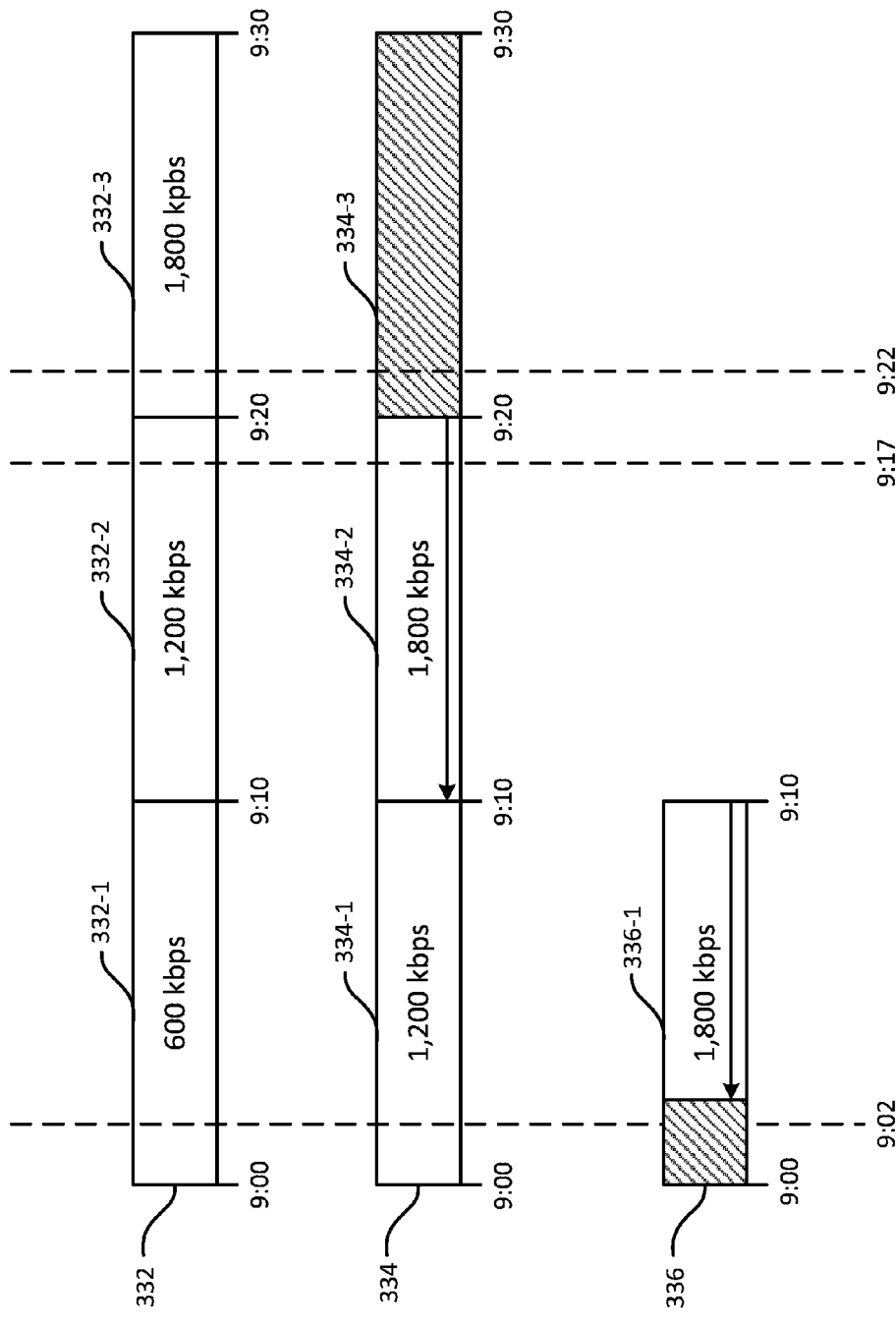

Record logic 328 may continue to use excess bandwidth 606 to completely fill segment 334-2, for example, as shown in FIG. 7E. Record logic 328 may also continue to use excess bandwidth 606 to fill segment 336-1 of file 336, as also shown in FIG. 7E. In this example, after video stops playing at 9:30, then excess bandwidth logic 324 determines (block 522) that there is 2000 kbps of excess bandwidth 708. Record logic 328 may use excess bandwidth 708, if needed, to complete downloading video in segment 334-2 and/or segment 336-1 of file 336. In one embodiment, if a segment is not yet full (e.g., segment 334-1) when a higher-quality contemporaneous segment may be filled (e.g., segment 336-1), then downloading for the lower-quality segment (e.g., segment 334-1) may be abandoned in favor of the higher-quality segment (e.g., segment 336-1). For example, as shown in FIG. 7F, downloading for segment 334-1 of file 334 was abandoned in favor of segment 336-1 of file 336.

Figure 5C:
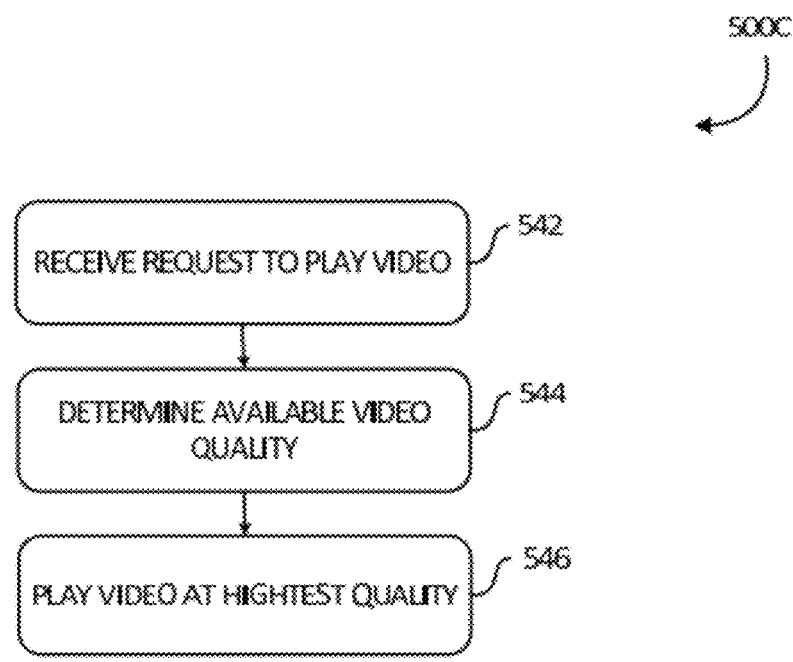
FIG. 5C is a flowchart of a process for playing video having been recorded at different qualities.

Should a user desire to play video 312 (e.g., once stored in STB 156), then play logic 322 may select the best quality video for playback. FIG. 5C is a flowchart of a process 500C for playing video having been recorded at different qualities. Process 500C may begin with the receipt of a request to play video (block 542). For example, the user may request to play video starting at point 9:02. The available video quality may be determined (block 544). In this case, play logic 322 determines that a file of 600 kbps quality, a file of 1200 kbps quality and a file of 1800 kbps quality exists for time 9:03. The highest-quality video may be played (block 546). Play logic selects segment 336-1, e.g., the highest quality video, for playback. At 9:10, the determination changes and play logic 322 may select segment 334-2 for playback. At 9:20, the determination changes again and play logic 322 may select segment 332-3 for playback.

Figure 8A:
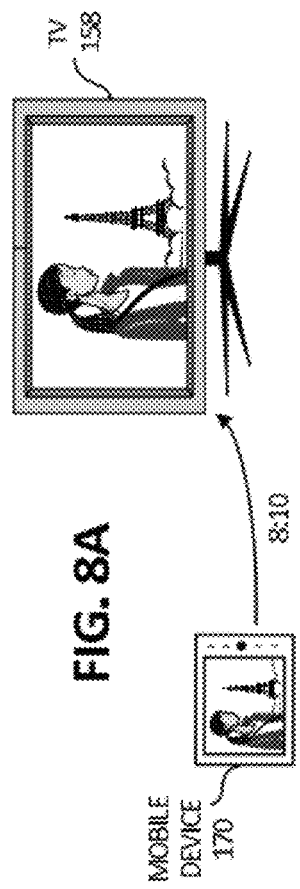
FIG. 8A is a diagram of another exemplary embodiment.
Figure 8B:
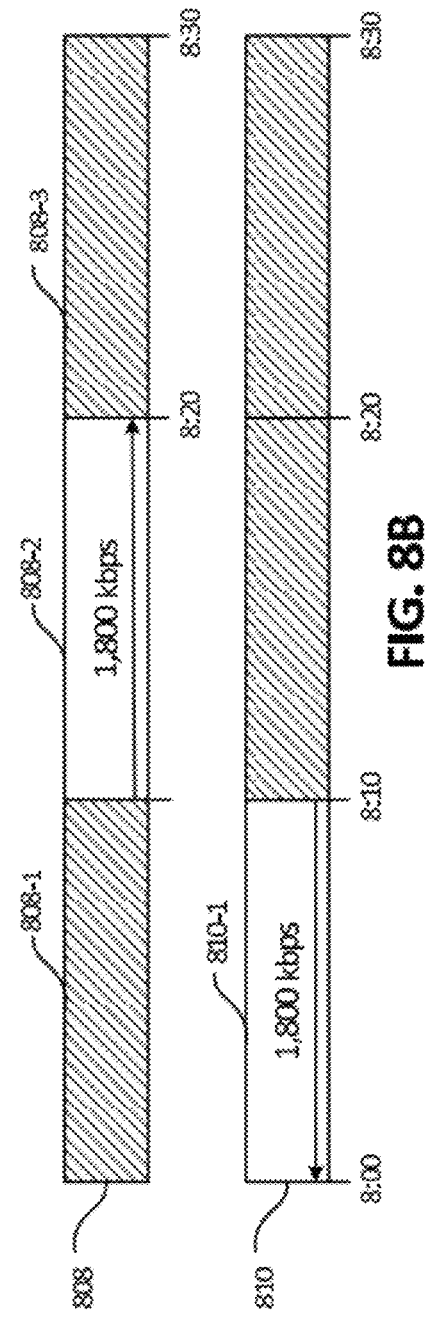
FIG. 8B is a block diagram of exemplary data files for the embodiment of FIG. 8A.

FIG. 8A is a block diagram of another exemplary embodiment. In the example of FIG. 8A, mobile device 170 is displaying content that the user wishes to continue to watch on TV 158. At time 8:10, the user instructs play to transfer from mobile device 170 to TV 158. FIG. 8B is a block diagram of the files stored in STB 156 associated with TV 158 for the playback of the transferred content. At time 8:10, STB 156 receives (e.g., from web server 118) and stores content at 1800 kbps in file 808, segment 808-2, because, for example, the available bandwidth permits. In case the user wishes to rewind the video to view content from 8:00 to 8:10, however, STB 156 may also use excess bandwidth (if any exists) to download the video stored in the quality of 1800 kbps (e.g., at a rate of 200 kbps) in file 810, segment 810-1. Thus, if the user rewinds to 8:05, play logic 326 may read and play the data stored in file 810, segment 810-1.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Further, certain portions of the invention may be implemented as logic that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the articles "a" and the term "one of" are intended to include one or more items. Further, the phrase "based on" is intended to mean "based, at least in part, on" unless explicitly stated otherwise.

What is claimed is:

1. A method comprising:
   downloading a first segment of a video in a first bitrate quality at the first bitrate, wherein the first bitrate quality corresponds to a first video resolution, and wherein the first segment corresponds to a first time period in the video;
   displaying the downloaded first segment of the video in the first bitrate quality;
   downloading, after downloading the first segment in the first bitrate quality, a second segment of the video in a second bitrate quality at the second bitrate, wherein the second bitrate is greater than the first bitrate and corresponds to a second video resolution higher than the first video resolution, and wherein the second segment corresponds to a second time period in the video after the first time period;
   displaying the downloaded second segment of the video in the second bitrate quality;
   downloading, after downloading the first segment in the first bitrate quality and after displaying at least a portion of the downloaded second segment in the second bitrate quality, the first segment of the video, corresponding to the first time period, in the second bitrate quality using excess bandwidth while downloading the second segment of the video in the second bitrate quality at the second bitrate; and
   storing the downloaded first segment of the video in the second bitrate quality.

2. The method of claim 1, wherein downloading the first segment at the first bitrate includes streaming the first segment.

3. The method of claim 2, wherein downloading the second segment includes streaming the second segment.

4. The method of claim 3, further comprising:
   receiving a command from a user to play the first segment of the video after the displaying of the second segment of the video in the second bitrate quality; and
   displaying the first segment of the video in the second bitrate quality in response to receiving the command from the user.

5. The method of claim 4, further comprising:
   comparing a quality of the stored first segment in the first bitrate quality and the stored first segment in the second bitrate quality and selecting for display a highest quality segment.

6. The method of claim 4, wherein receiving a command from the user includes receiving a command to rewind the video from the second segment to the first segment.

7. The method of claim 1, wherein the downloading the first segment of the video in the second bitrate quality includes downloading the first segment in the second bitrate quality at a rate less than the second bitrate.

8. The method of claim 1, further comprising:
   determining a first available bandwidth for downloading a video; and
   requesting the video stored in a first bitrate quality, wherein the first bitrate is less than the first determined available bandwidth.

9. The method of claim 8, further comprising:
   determining a second available bandwidth for streaming the video; and
   requesting the video stored in a second bitrate quality, wherein the second bitrate is less than the second available bandwidth, and wherein the second determined bandwidth is greater than the first determined bandwidth.

10. A network device comprising:
    a receiver to receive a first segment of a video in a first bitrate quality at the first bitrate and to download a second segment of the video in a second bitrate quality at the second bitrate, wherein the second bitrate is greater than the first bitrate, wherein the first bitrate quality corresponds to a first video resolution, wherein the second bitrate quality corresponds to a second video resolution higher than the first video resolution, and wherein the first segment corresponds to a first time period in the video and the second segment corresponds to a second time period in the video after the first time period;
    a memory to store the received first segment of the video in the first bitrate quality and the received second segment of the video in the second bitrate quality;
    a transmitter to send the received first segment in the first bitrate quality to a display for playing and to send the received second segment in the second bitrate quality to the display for playing;
    wherein the receiver is configured to receive, after the receiver receives the first segment in the first bitrate quality and after the display plays at least a portion of the downloaded second segment in the second bitrate quality, the first segment of the video in the second bitrate quality using excess bandwidth while receiving the second segment of the video in the second bitrate quality at the second bitrate; and
    wherein the memory stores the received first segment of the video in the second bitrate quality.

11. The network device of claim 10, further including a display to display the first segment of the video in the first bitrate quality while the receiver receives the first segment of the video in the first bitrate quality.

12. The network device of claim 11, wherein the display is configured to display the second segment of the video in the second bitrate quality while the receiver receives the second segment of the video in the second bitrate quality.

13. The network device of claim 12, wherein the receiver is configured to receive a command from a user to play the first segment of the video in the second bitrate quality, the network device further comprising a processor to compare a quality of the stored first segment in the first bitrate quality and the stored first segment in the second bitrate quality and selecting for display a highest quality segment.

14. The network device of claim 10, wherein the receiver is configured to download the first segment of the video in the second bitrate quality at a rate less than the second bitrate.

15. The network device of claim 10, further comprising:
    a processor to determine a first available bandwidth for downloading a video; and a transmitter to transmit a request for the video stored in a first bitrate quality, wherein the first bitrate is less than the first determined available bandwidth.

16. The network device of claim 15, wherein the processor is configured to determine a second available bandwidth for streaming the video; and wherein the transmitter is configured to transmit a request for the video stored in a second bitrate quality, wherein the second bitrate is less than the second available bandwidth, and wherein the second determined bandwidth is greater than the first determined bandwidth.

17. A method comprising:
determining a first available bandwidth for downloading a video;
requesting the video stored in a first bitrate quality, wherein the first bitrate corresponds to a first video resolution and is less than the first determined available bandwidth;
downloading a first segment of the requested video in the first bitrate quality, wherein the first segment corresponds to a first time period in the video;
displaying the downloaded first segment in the first bitrate quality;
determining a second available bandwidth for streaming the video;
requesting the video stored in a second bitrate quality, wherein the second bitrate corresponds to a second video resolution higher than the first video resolution and is less than the second available bandwidth, and wherein the second determined bandwidth is greater than the first determined bandwidth and the second bitrate is greater than the first bitrate;
downloading a second segment of the requested video in the second bitrate quality, wherein the second segment corresponds to a second time period in the video after the first time period;
displaying the downloaded second segment in the second bitrate quality;
downloading, after downloading the first segment in the first bitrate quality and after displaying at least a portion of the downloaded second segment in the second bitrate quality, while concurrently streaming the second segment of the requested video, the first segment of the of the requested video at the second bitrate quality.

18. The method of claim 17, further comprising:
determining an excess bandwidth during a second period of time, wherein the downloading the first segment of the requested video at the second bitrate quality includes downloading the first segment using the determined excess bandwidth.

19. The method of claim 17, wherein downloading the first segment of the requested video at the first bitrate quality includes streaming the first segment at the first bitrate.

20. The method of claim 19, wherein downloading the second segment of the requested video at the second bitrate quality includes streaming the second segment at the second bitrate.

21. The method of claim 20, further comprising:
receiving a request by a user to play the first segment of the displaying of the second segment at the second bitrate quality;
displaying the first segment at the second bitrate quality to the user.

* * * * *